United States Patent [19]

Furomoto

[11] Patent Number: 5,308,018
[45] Date of Patent: May 3, 1994

[54] DRAG CONTROL STRUCTURE FOR BAITCASTING REEL

[75] Inventor: Yoshiyuki Furomoto, Osaka, Japan
[73] Assignee: Shimano Inc., Osaka, Japan
[21] Appl. No.: 829,376
[22] Filed: Feb. 3, 1992
[30] Foreign Application Priority Data

Feb. 5, 1991 [JP] Japan .......................... 3-003874[U]

[51] Int. Cl.[5] ........................................ A01K 89/033
[52] U.S. Cl. ...................................... 242/271; 242/319
[58] Field of Search ............... 242/269, 270, 271, 303, 242/304, 319

[56] References Cited

U.S. PATENT DOCUMENTS

| | | | |
|---|---|---|---|
| 2,329,381 | 9/1943 | Bannister | 242/271 X |
| 3,425,644 | 2/1969 | Griste | 242/27 D |
| 3,966,140 | 6/1976 | Coquelet et al. | 242/271 |
| 4,056,246 | 11/1977 | Purcell | 242/270 |
| 4,742,974 | 5/1988 | Furomoto | 242/271 |
| 4,813,629 | 3/1989 | Hashimoto et al. | 242/319 X |
| 4,871,129 | 10/1989 | Hashimoto | 242/271 X |

Primary Examiner—Daniel P. Stodola
Assistant Examiner—Michael R. Mansen
Attorney, Agent, or Firm—Dickstein, Shapiro & Morin

[57] ABSTRACT

A drag control structure for a baitcasting reel comprising a drag control element mounted on a lateral outer face of one side case to be movable along the lateral outer face, and a stopper operable between a contacting position to receive the drag control element at a predetermined drag position to stop the drag control element from moving in a direction to increase a drag force, and a rest position to allow the drag control element to move in the direction to increase the drag force from the predetermined drag position. The stopper is movable along the lateral outer face between the contacting position and the rest position. The stopper also remains inobtrusive from an outer peripheral edge of the lateral outer face throughout a moving area thereof.

6 Claims, 5 Drawing Sheets

DRAG CONTROL STRUCTURE FOR BAITCASTING REEL

BACKGROUND OF THE INVENTION

1. Field of the Invention

The present invention relates to a baitcasting reel including stopper means for defining a strike position of a drag control element, for example, and more particularly to a baitcasting reel including a drag control element mounted on and movable along a lateral outer face of one side case, and stopper means for switching the drag control element between a contacting position for restricting the drag control element from moving in a direction to increase a drag force at a predetermined drag position and a rest position for permitting the drag control element to move in a direction to increase the drag force from the predetermined drag position.

2. Description of the Related Art

With the conventional reels, an example of which is shown in Japanese Patent Publication No. 49-16319, the stopper means is inlaid in an outer peripheral edge of the lateral outer face of the side case to be movable along therewith between the contacting position and the rest position. A head of the stopper means projects from the outer edge of the outer side face in the contacting position.

With such a structure, since the head of the stopper is exposed in the contacting position, the angler tends to touch the stopper means during operations other than to change position of the stopper means, which makes it difficult to effect the other operations, or sometimes mars stopper means if the hand of the angler violently hits the stopper means unconsciously.

SUMMARY OF THE INVENTION

A primary object of the present invention is to provide a baitcasting reel with which a switching operation of stopper means can be readily effected by improving mounting of the stopper means to overcome the above-noted problem.

In order to achieve the object, the present invention is characterized by the stopper means movable between a contacting position and a rest position along a lateral outer face of one side case, the stopper means remaining inobtrusive from an outer peripheral edge of the lateral outer face throughout a moving area for varying the position thereof.

This structure has the following functions and effects.

When a drag control element is operated in a direction to increase a drag force in which the stopper means is in the contacting position, a drag force is fixed to that position. In order to further increase the drag force, the stopper means is moved to the rest position along the lateral outer face to pass the drag control element.

Since the stopper means is positioned within the outer peripheral edge between the contacting and rest positions and moves along the lateral outer face, it less frequently projects outwardly from the lateral outer face than the case in which the stopper means moves in a direction perpendicular to the lateral outer face. As a result, the stopper means does not tend to be interfered or caught by the angler inadvertently to be marred.

In addition, the stopper means moves along the lateral outer face of the side case, the drag control element can be operated in a direction to increase the drag force with a finger contacting the drag control element while the stopper means can be retracted to the rest position with another finger, which facilitates an operation.

Other objects, advantages and features of the invention will be apparent from the following description referring to the accompanying drawings.

BRIEF DESCRIPTION OF THE DRAWINGS

The accompanying drawings illustrate a baitcasting reel according to the present invention, in which.

DETAILED DESCRIPTION OF THE PREFERRED EMBODIMENTS

Figure 1:
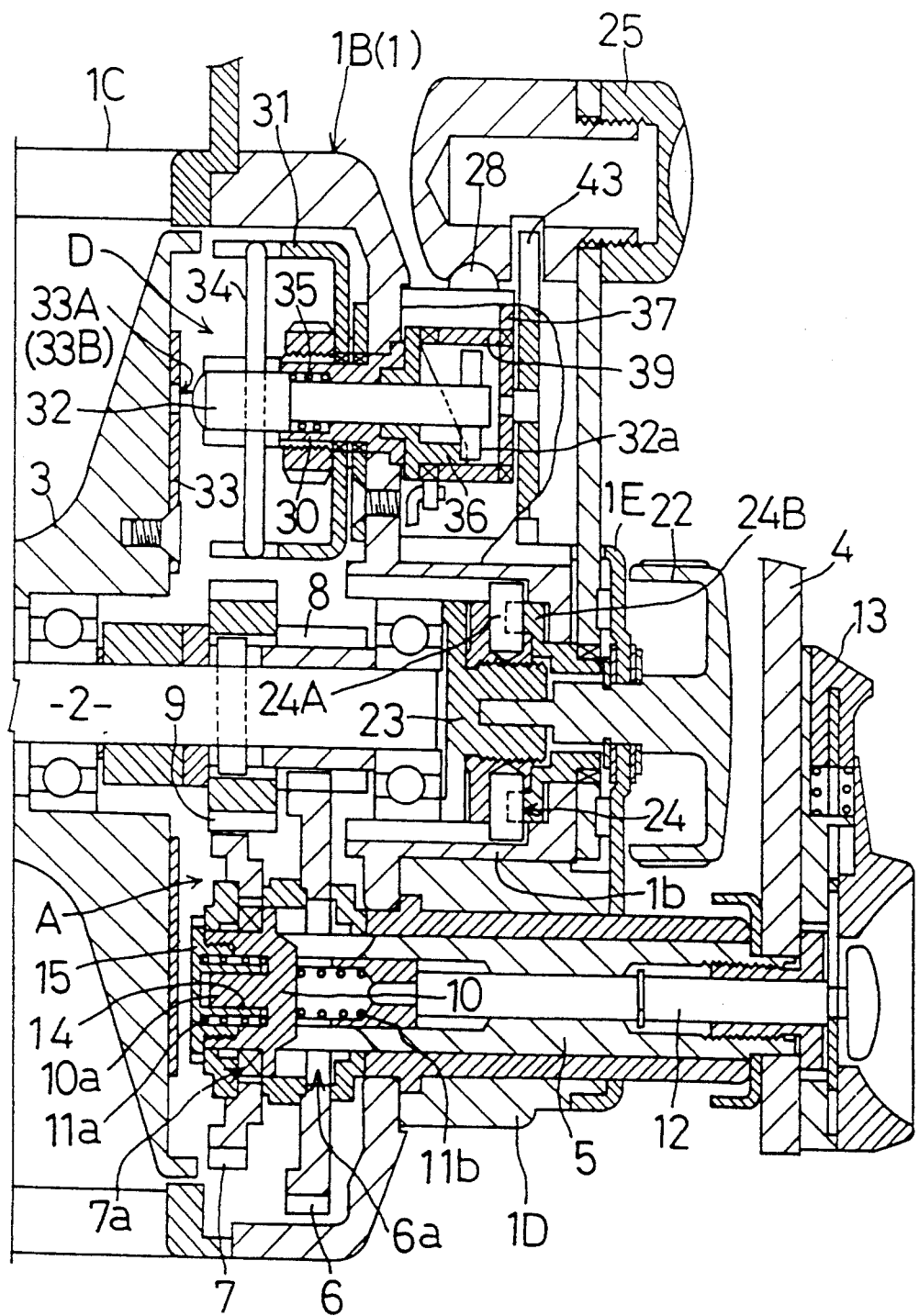
FIG. 1 is a sectional view of a right side case of the reel revealing an internal structure thereof.

A drag control structure for a baitcasting reel according to the present invention will be described in detail hereinafter referring to the drawings.

Figure 2:
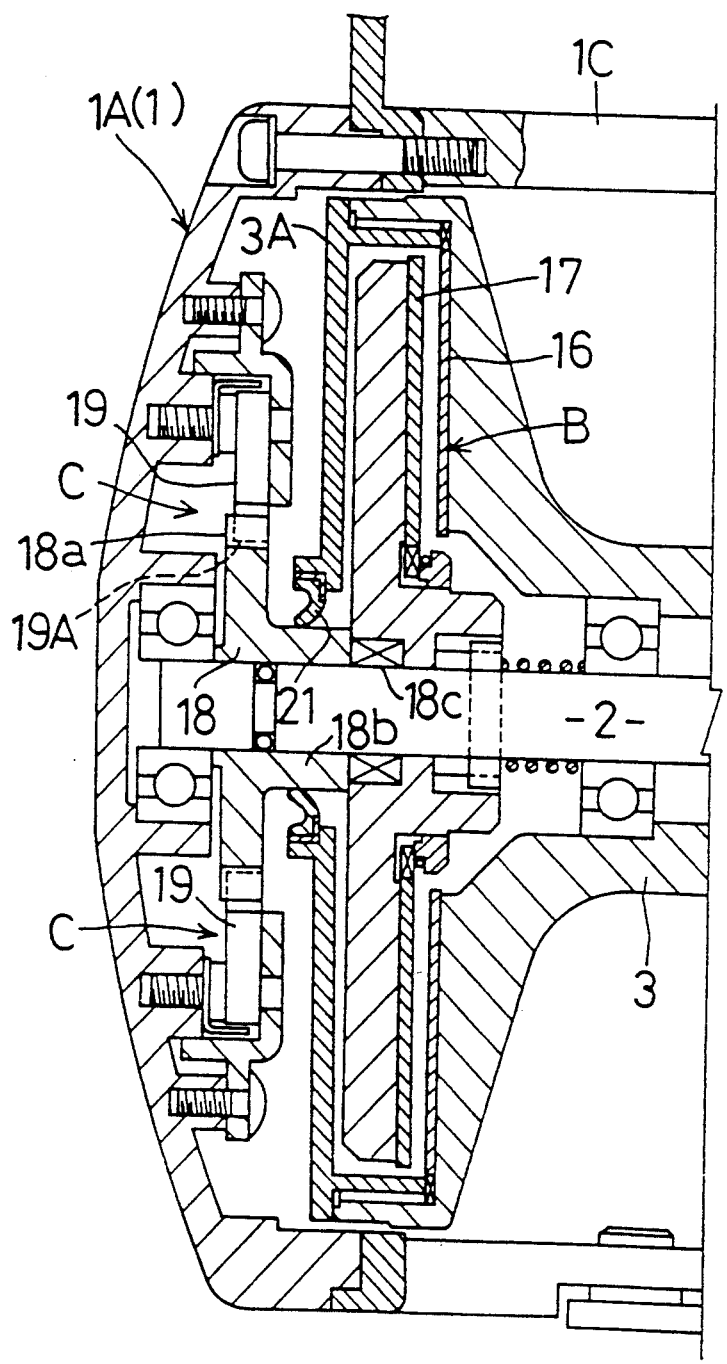
FIG. 2 is a sectional view of a left side case of the reel revealing an internal structure thereof.

FIGS. 1 and 2 show a baitcasting reel comprising a body 1, a spool shaft 2 horizontally mounted in the reel body, and a spool 3 rotatably supported by the spool shaft 2 for taking up a fishing line. The reel further comprises a handle 4, a sleeve shaft 5 connected to the handle 4, a speed change gear mechanism A, and a drag mechanism B. Drive from the sleeve shaft 5 is transmitted to the spool 3 through the speed change gear mechanism A and the drag mechanism B. These components constitute a winding-up transmission line.

The reel body 1 includes right and left side cases 1B and 1A, a cross frame 1C interconnecting the side cases 1A and 1B, and a handle supporting case 1D mounted on the right side case 1B. Each of those elements 1A, 1B, 1C and 1D is formed by forging and cutting or die-casting aluminum.

Referring to FIG. 1, the speed change gear mechanism A includes a first gear 6 for taking up the fishing line at high speed and a second gear 7 for taking up the fishing line at low speed, which gears are rotatably supported by the sleeve shaft 5, a third gear 8, a fourth gear 9 rotatable in unison with the spool shaft 2 and meshed with the first and second gears 6 and 7, respectively, an engaging element 10 slidably supported by the sleeve shaft 5 to be engageable into engaged bores 6a and 7a defined in the first and second gears 6 and 7 for transmitting the drive from the sleeve shaft 5 to either one of the first and second gears 6 and 7, inner and outer compression springs 11a and 11b for positioning the engaging element 10, and a control shaft 12 for determining position of the engaging element 10. With this speed change gear mechanism A, the engaging element 10 is engaged into the engaged bore 6a defined in the first gear 6 under an urging force of the inner compression spring 11a with the control shaft 12 being pushed out. When the control shaft 12 is pushed in as shown in FIG. 1, the inner compression spring 11a is compressed and the engaging element 10 is engaged into the engaged bore 7a defined in the second gear 7 under an urging force of the outer compression spring 11b.

The control shaft 12 defines a groove in an outward end region thereof for engaging a slidable stopper 13 attached to the handle 4. The control shaft 12 is pushed in, the stopper 13 engages the control shaft 12 and maintains it in that position. If the engaging element 10 and the engaged bore 7a of the second gear 7 are not in phase with each other, the engaging element 10 is maintained in contact with a side face of the second gear 7. When the handle 4 is rotated thereafter to move the engaging element 10 into phase with the engaged bore 7a, the engagement therebetween is completed under the urging force of the outer compression spring 11b.

With this speed change gear mechanism A, the engaging element 10, guided by a slit defined in the sleeve shaft 5, is prevented from inclining in a plane perpendicular to an axis of the sleeve shaft 5, i.e. inclining in a direction of rotation, through contact with inner walls of the slit. However, the engaging element 10 tends to incline in a plane along the axis of the sleeve shaft 5. In order to prevent this inclination, the engaging element 10 includes a projection 10a extending through the sleeve shaft 5 toward an inward end of the sleeve shaft 5. A tubular position retaining element 14 is provided for slidably contacting the projection 10a to prevent the inclination of the engaging element 10 when the engaging element 10 is operated toward the inward end of the sleeve shaft 5.

The position retaining element 14 is integrally formed with a spring bearing 15 screwed to the inward end of the sleeve shaft 5.

The drag mechanism B will be described next.

Referring to FIG. 2, the drag mechanism B is mounted adjacent the left side case 1A opposite to the right side case 1B supporting the handle 4. The spool 3 is rotatable about and slidable along an axis of the spool shaft 2. A friction plate 16 is disposed on a lateral outer face of the spool 3, while a mating element 17 having a friction surface is opposed to the friction plate 16. The mating element 17 is rotatable in unison with the spool shaft 2 and movable along the axis of the spool shaft. As shown, the drag mechanism B allows the spool 3 to move along with the spool shaft 2 from an inoperative position spaced apart from the mating element 17 to an operative position in which the friction plate 16 acts on the friction surface of the mating element 17.

A control structure for the drag mechanism B will be set forth below.

Referring back to FIG. 1, a preset knob 22 is attached to a plate 1E and to the right side case 1B at a position of the axis of the spool shaft 2 through the handle supporting case 1D to be only rotatable. At an inward end portion of the present knob 22 are mounted an intermediate transmission element 23 and a movable cam element 24A screwed to the intermediate transmission element 23 to allow screw feed of the intermediate transmission element 23. The movable cam element 24A is also movable axially of the spool shaft 2 along with the intermediate transmission element 23. The intermediate transmission element 23 is attached to the preset knob 22 to be rotatable in unison therewith and movable axially of the spool shaft 2 relative to the preset knob 22 and the movable cam element 24A through a cam mechanism 24 as described in detail later.

The intermediate transmission element 23 mounted for screw feeding in the movable cam element 24A forming part of the cam mechanism 24. The movable cam element 24A is attached to a boss portion 1b of the right side case 1B to be relatively slidable through a slit only axially of the spool shaft. A rotary cam element 24B facing the movable cam element 24A is relatively rotatably disposed on an inner surface of the boss portion 1b. At an outer end portion of the rotary cam element 24B is mounted a drag control element 25 rotatable in unison therewith.

The cam mechanism 24 is mounted on a contact portion between the rotary cam element 24B and the movable cam element 24A. When the drag control element 25 is rotated about the spool shaft 2, the movable cam element 24A and the intermediate transmission element 23 are moved together axially of the spool shaft by the action of the cam mechanism 24.

As set forth above, the preset knob 22 can move only the intermediate transmission element 23 to initially determine a drag force, while the drag control element 25 can move the movable cam element 24A and the intermediate transmission element 23 together to increase or decrease the drag force from the initial setting.

Figure 3:
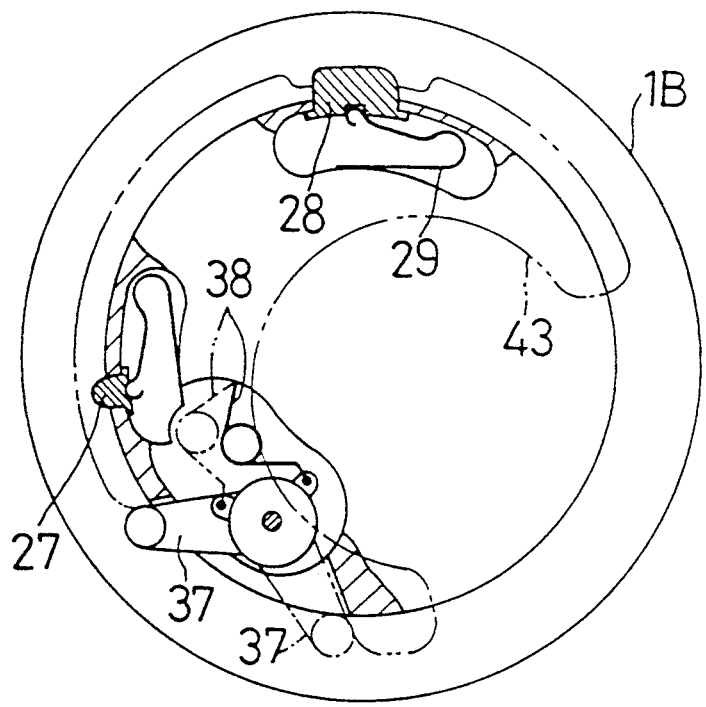
FIG. 3 is a partially broken-away side view showing stoppers.
Figure 4:
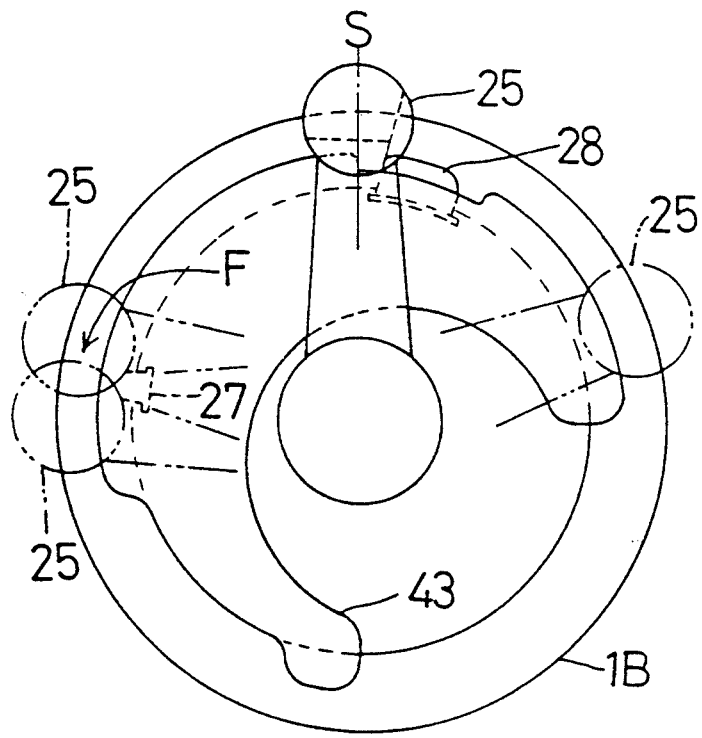
FIG. 4 is a side view showing a positional relationship between the first and second stoppers and a drag control element.

Referring now to FIGS. 3 and 4, a first stopper 27 is urged to project outwardly in an illustrated F position within an operative area of the drag control element 25. The drag control element 25 receives a resistance at a position of the first stopper 27 in which the drag force is minimum, thereby to inform the operator that the drag control element 25 has reached the F position. When the drag control element 25 is required to move to an inoperative area, the first stopper 27 is forcibly depressed to allow movement of the drag control element 25. A second stopper 28 is provided at a strike position S for contacting the drag control element 25 moved in a direction to increase the drag force. The second stopper 28 is switchable between a contacting position to which the stopper 28 is urged by an urging spring 29, and a rest position to which the stopper is retracted from a moving area of the drag control element 25 through a manual operation by the angler. A head of the second stopper 28 is radially pressed in along a side face of the right side case 1B, thereby to allow the drag control element 25 to be moved to a stronger drag area.

As mentioned above, the second stopper 28 is urged by the spring 29 to project and is pressed in along the side face of the right side case 1B. Even in the projecting position, the head of the second stopper 28 does not lie outwardly of an outer peripheral edge of the right side case 1B. This construction effectively protects the second stopper 28 per se from damage resulting from the head of the stopper being caught by the angler.

For returning from the stronger drag area to the normal drag area, the drag control element 25 is simply moved in the corresponding direction. The second stopper 28 is then depressed to the rest position by the drag control element 25. The second stopper 28 automatically returns to the contacting position after passage of the drag control element 25. Numeral 43 denotes a guide plate for the drag control element 25.

A mechanism D for producing a sound when the spool is rotated will be described hereinafter.

As shown in FIG. 1, a rotary supporting boss 30 is mounted within the right side case 1B. A sound ring 31 is screwed on the rotary supporting boss 30 for producing the sound and a swing pin 32 acting as an intermediate transmission member is supported within the rotary supporting boss 30 to be reciprocable axially of the spool shaft.

Figure 6:
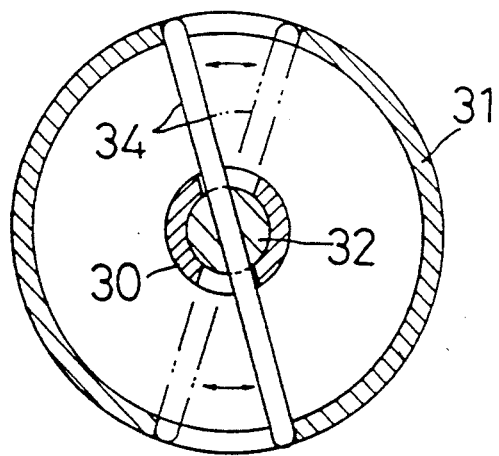
FIG. 6 is a side view showing operations of a sound ring and an intermediate transmission element.
Figure 7:
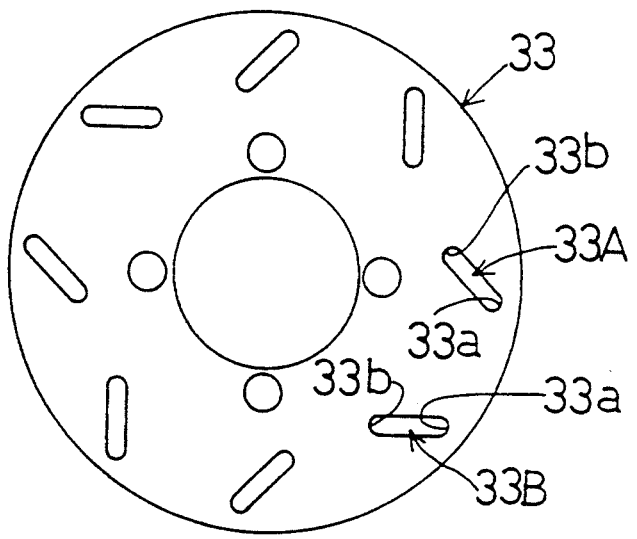
FIG. 7 is a side view of a rotary disk.

Referring to FIG. 7, a rotary disk 33 is attached to a lateral face of the spool 3 facing the swing pin 32 to contact an extreme end of the swing pin 32. Snapping bores 33A acting as engaging portions are defined in the rotary disk 33 to engage and snap the swing pin 32. The swing pin 32 carries a striking rod 34 for colliding at opposite ends thereof with engaging grooves defined in the sound ring 31 to produce a clicking sound. As shown in FIG. 7, each snapping bore 33A has longitudinal sides inclined by a predetermined angle with respect to a radial direction, i.e. one end 33a of the snapping bore 33A which acts as a first engaging portion is displaced toward the center of rotation with reference to the other end 33b. Thus, the swing pin 32 receives a radially moving force from the time of engagement with the snapping bore 33A till it disengages therefrom. Meanwhile, the pin 32 receives a circumferential moving force, resulting in a torque acting about an axis of the pin. Then, the striking rod 34 strikes the sound ring 31. An adjacent snapping bore 33B acting as a second engaging portion is inclined in an opposite direction to apply a rotational force in the opposite direction to the swing pin 32, whereby the striking rod 34 strikes the sound ring. Thus, as shown in FIG. 6, the striking rod 34 is repeatedly switchable between a position as shown in solid lines and a position as shown in two-dot-chain lines to generate clear sounds.

A spring 35 is mounted between the swing pin 32 and the rotary supporting boss 30 for urging and projecting the swing pin 32. At an outer end portion of the rotary supporting boss 30 is mounted a rotary cam 36 having an outer cam face to contact a rear end pin 32a of the swing pin 32 to restrict projection of the swing pin 32. A drive frame 39 and a changeover lever 37 are provided for engaging and rotating the rotary cam 36. The changeover lever 37 is turnable in opposite directions to retract and extend the swing pin 32 to be switchable between a sound producing position and a non-sound producing position. Numeral 38 in FIG. 3 denotes a toggle spring for maintaining the swing pin 32 in the two alternative positions.

Figure 5:
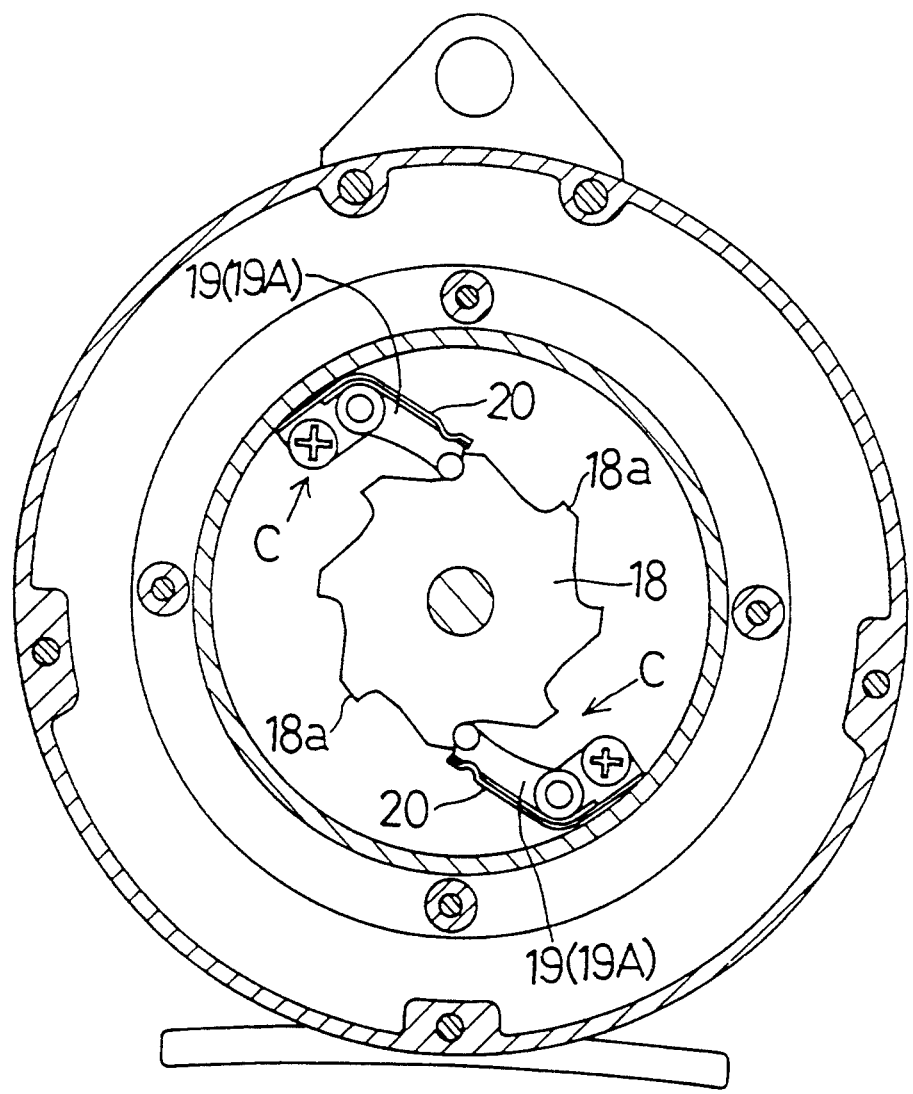
FIG. 5 is a side view of a reverse rotation preventing mechanism.

As shown in FIG. 2, a ratchet wheel 18 is rigidly connected to the mating element 17 through a connecting portion 18c adjacent the left side case 1A, while ratchet pawls 19 are pivotably supported by inner peripheries of the left side case 1A to be engageable with outer circumferential teeth 18a defined on the ratchet wheel 18. Referring to FIG. 5, each ratchet pawl 19 defines an extreme hook portion 19A engageable with the teeth 18a of the ratchet wheel 18 and receiving an engaging force from a blade spring 20. The ratchet wheel 18 and the ratchet pawls 19 together constitute an anti-reverse mechanism C for locking the spool 3 against rotation in a fishing line feeding direction of the spool 3.

As shown in FIG. 2, a cover member 3A extends from an end of the spool 3 for surrounding the friction faces of the drag mechanism B. The cover member 3A receives a boss portion 18b of the ratchet wheel 18 in an inner periphery thereof. An annular lip seal 21 is disposed between the inner periphery of the cover member 3A and an outer periphery of the boss portion 18b. The ratchet wheel 18 with the outer peripheral teeth allows an outer diameter of the boss portion 18b carrying the annular seal 21 with a simple structure to be reduced to the extent that the boss portion 18 can withstand shocks received from the ratchet pawls 19. The reduced outer diameter of the boss portion 18b is smaller than that of the outer teeth 18a of the ratchet wheel 18, which can reduce a rotational resistance applied to free rotation of the spool 3 by the annular seal 21, and at the same time enhance a reliable waterproof effect. The annular seal 21 can also define a small seal lip contacting the boss portion 18b, which can dispense with any mechanism for canceling the contact between the seal lip and the boss portion 18b at the time of free rotation of the spool.

Other embodiments will be listed below.

Figure 8:
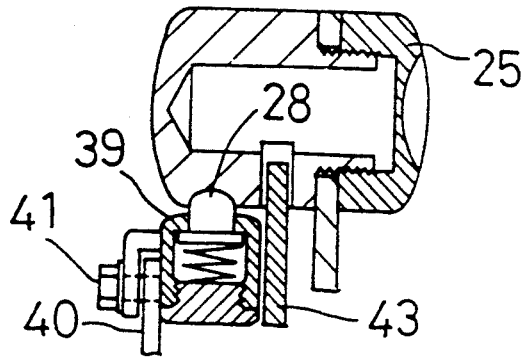
FIG. 8 is a vertical section showing a stopper according to another embodiment.

(1) Referring to FIG. 8, the stopper 28 may be modified to include a second guide plate 40 extending in a moving direction of the drag control element 25, and a stopper holder 39 attached to the second guide plate 40. The stopper may be movable along the second guide plate 40 and fixable through a retainer screw 41. In this way, the stopper 28 may be extendibly and retractably inserted into the holder 39.

With such a structure, position of the stopper 28 may be varied following changes of an operating point of the drag mechanism B resulting from a long-term use.

(2) The stopper 28 may be pulled upwardly to switch to a rest position.

What is claimed is:

1. A drag control structure for a baitcasting reel having a spool and a frictional drag for retarding rotation of the spool, comprising:

a side case having an outer periphery;

a drag control element mounted to said side case, said drag control element being movable along an arcuate path, said arcuate path being located in a first plane;

a first guide plate for guiding said drag control element along said arcuate path, said guide plate being located adjacent to said side case, and said guide plate being substantially parallel to said first plane, said guide plate having an outer peripheral edge;

a stopper for selectively restricting movement of said drag control element, said stopper being radially movable, relative to said arcuate path of said drag control element, from a contacting position to a rest position, said drag control element being prevented from moving past said stopper when said stopper is in said contacting position, said drag control element being permitted to move past said stopper when said stopper is in said rest position; and wherein said stopper does not protrude radially outwardly of said periphery of said side case, and wherein said stopper does not protrude radially outwardly of said outer peripheral edge of said guide plate.

2. A drag control structure as claimed in claim 1, further comprising:

a rotatable spool;

a present knob (22) rotatably attached to said side case, the axis of rotation of said knob being coaxial with the axis of rotation of said spool, said knob having an inner end portion;

a movable cam element (24A) and an intermediate transmission element (23), said cam element being mounted on said intermediate transmission element, said transmission element being connected to said inner end portion of said preset knob; and a rotary cam element (24B) opposed to said movable cam element, said rotary cam element having an outer end portion, said drag control element being mounted on said outer end portion of said rotary cam element, said drag control element and said rotary cam element being rotatable in unison.

3. A drag control structure as claimed in claim 1, wherein said stopper is located at a strike position (S).

4. A drag control structure as claimed in claim 3, further comprising a minimum force position stopper (27) for selectively restricting movement of said drag control element, said minimum force position stopper being located at a pre-set minimum force position for said drag control element, said minimum force position stopper being biased radially outwardly relative to said arcuate path of said drag control element, and said minimum force position stopper being movable radially inwardly to permit said drag control element to move past said minimum force position.

5. A drag control structure as claimed in claim 1, further comprising a stopper holder (39) for holding said stopper (28), and a second guide plate (40) for supporting said stopper holder, said second guide plate being substantially parallel to said first plane, said stopper holder being releasably fixed to said second guide plate.

6. A drag control structure for a baitcasting reel having a spool and a frictional drag for retarding rotation of the spool, comprising:

a side case having an outer periphery;

a drag control element mounted to said side case, said drag control element being movable along an arcuate path, said arcuate path of said drag control element being located in a first plane;

a first guide plate for guiding said drag control element along said arcuate path, said guide plate being located adjacent to said side case, and said guide plate being substantially parallel to said first plane, said guide plate having an outer peripheral edge;

a stopper for selectively restricting movement of said drag control element, said stopper being radially movable, relative to said arcuate path of said drag control element, from a contacting position to a rest position, said drag control element being prevented from moving past said stopper when said stopper is in said contacting position, said drag control element being permitted to move past said stopper when said stopper is in said rest position;

a stopper holder for holding said stopper, and a second guide plate for supporting said stopper holder, said second guide plate being substantially parallel to said first plane, said stopper holder being releasably fixed to said second guide plate, such that said stopper is movable along said second guide plate; and a minimum force position stopper for selectively restricting movement of said drag control element, said minimum force position stopper being located at a pre-set minimum force position for said drag control element, said minimum force position stopper being biased radially outwardly relative to said arcuate path of said drag control element, and said minimum force position stopper being movable radially inwardly to permit said drag control element to move past said minimum force position; and wherein said stoppers do not protrude radially outwardly of said periphery of said side case, and wherein said stoppers do not protrude radially outwardly of said outer peripheral edge of said first guide plate.

* * * * *